Feb. 20, 1962  R. W. DORST  3,021,535
SWING-OVER WINDSHIELD FOR MOTORBOATS
Filed Dec. 7, 1959
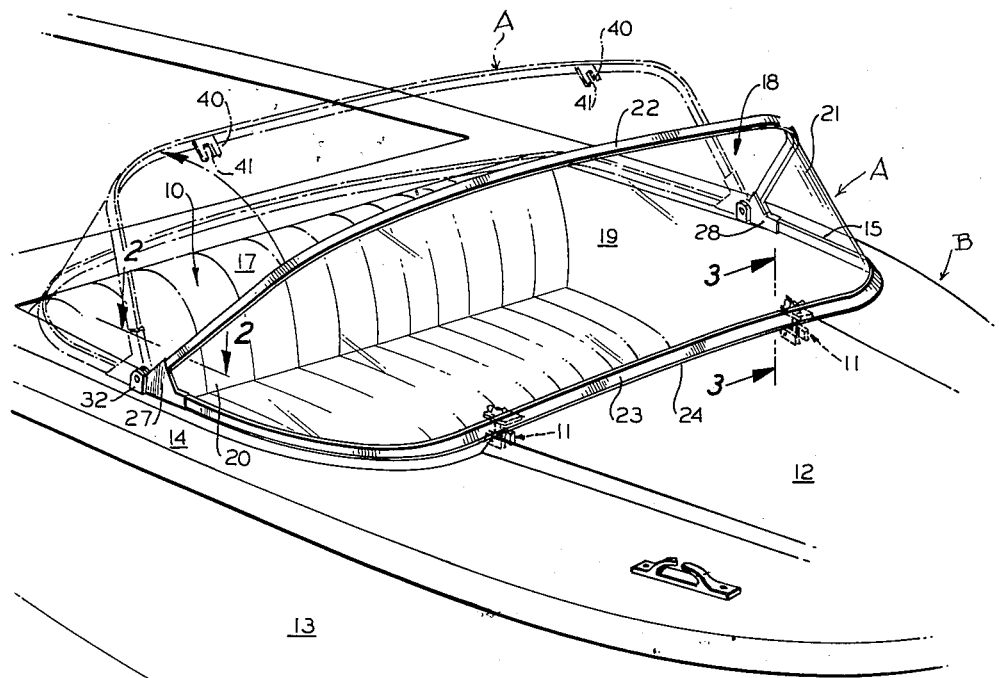
INVENTOR
RICHARD W. DORST
BY
ATTORNEYS 3,021,535
SWING-OVER WINDSHIELD FOR MOTORBOATS
Richard W. Dorst, Menlo Park, Calif., assignor to Textron Inc., Providence, R.I., a corporation of Rhode Island
Filed Dec. 7, 1959, Ser. No. 857,929
5 Claims. (Cl. 9—1)

The present invention relates to a windshield, and pertains more particularly to a windshield for motorboats, especially those of the runabout type having a forward deck.

In small outboard and inboard motorboats, particularly those of the runabout type, it is customary to have a front seat extending transversely across the cockpit of the motorboat, and to have the portion from the front cockpit forward to the bow decked over. A windshield ordinarily is provided around the forward edge of the front cockpit to protect the occupants of the boat from the wind and spray created by forward movement of the boat through the water. While such windshields are effective in so protecting the occupants of the front seat, they also seriously interfere with access of an occupant of the boat to the forward deck, where it is necessary, or at least desirable, to have a man when anchoring or mooring.

The invention contemplates the provision on a motorboat of a windshield which may be securely fastened in shielding position during normal operation of the boat, but which may be released from such shielding position and swung over the heads of occupants of the front seat of such boat to a position rearwardly of said seat, thereby providing clear access from the front seat to the forward deck of the boat.

A further object of the invention is to provide a hingedly mounted motorboat windshield which may be selectively (a) secured in forward, shielding position, (b) secured in slightly spaced relation to the forward deck of a boat upon which it is mounted for added ventilation at slow speed, or (c) may be released and swung rearwardly about a pivotal axis disposed midway of the length of a forward cockpit of such boat to a position rearwardly of a seat in front of which said windshield is normally mounted, thereby to permit an occupant of such seat to have easy access to the forward deck of such boat.

These, and other objects and advantages of the invention, will be apparent from the following description and the accompanying drawings, wherein:

FIG. 1 is a perspective view of the front cockpit and forward deck portion of a motorboat having a windshield embodying the invention mounted thereon.

FIG. 2 is an enlarged fragmentary sectional view taken along line 2—2 of FIG. 1.

FIG. 3 is an enlarged fragmentary sectional view taken along line 3—3 of FIG. 1.

FIG. 4 is a view similar to FIG. 3, but showing the windshield spaced from the fore deck to provide a ventilating gap at slow speeds.

Briefly, the invention comprises a windshield A with rearwardly extending, triangular side portions. The latter portions are hingedly connected to a boat B upon which the windshield is mounted approximately medially of the length of the boat's front cockpit 10.

The windshield A is releasably secured in its forward, operative position, as shown in solid lines in FIG. 1, by suitable retaining means such as a pair of releasable clamp screws 11. When these screws are released, the windshield A is freed for swinging rearwardly to its broken line position of FIG. 1, thereby clearing the way for an occupant of the cockpit to step onto the forward deck 12. Spacing means, such as a nut 11a is provided to support the windshield A in spaced relation to the fore deck to provide additional ventilation at slow speeds.

Referring to the drawings in greater detail, the illustrated windshield A embodying the invention is mounted on a motorboat B of a well known, runabout type having a usual hull 13, forward deck 12 and side decks 14 and 15. A propulsion motor, not shown, may be of conventional inboard or outboard type, as desired. A usual seat 17 extends transversely of the forward cockpit 10.

The windshield A comprises a transparent member 18 of sheet or plate material, which may be either safety glass or one of the heavy, clear, plastics commonly used for such purposes. The transparent member 18 has a rearwardly sloping, transverse forward portion 19, curving rearwardly at both sides into triangular side portions 20 and 21. The latter portions extend rearwardly approximately one half the distance from the forward end of the cockpit to the aft side of the seat 17. Usual metal trim channels 22 and 23 are provided along the upper and lower edges, respectively, of the transparent windshield member 18, and a sealing gasket 24 is provided along the under side of the lower trim channel 23 for sealing the lower edge of the windshield to the deck.

A pair of angle, hinge fittings 27 and 28 are provided at the intersection of the trim channels 22 and 23 on each triangular side portion 20 and 21, of the windshield. Each hinge fitting 27 and 28 is provided with a projecting tongue portion 29 of a size to fit between the upright plates 30 and 31 of a hinge fitting 32, one of which is secured to each side deck 14 and 15 approximately midway of the length of the cockpit 10. Co-axial hinge pins 33, inserted in aligned holes in the hinge plates 30 and 31 of the deck fittings 32, and in the tongues 29 of the windshield fittings 27 and 28, hingedly attach the windshield A to the boat B.

Each of the illustrated retaining members 11 which secure the windshield A in its operative, solid line position of FIG. 1, comprises a screw 34 having an eye portion 35 which is pivotally mounted on a bracket 37 secured to the cockpit front coaming 38 (FIG. 3). A wing nut 39 is screwed onto the threaded shank of each of the clamp screws 34, and is adapted to bear on a notched plate 40, one of which is provided on the lower windshield trim channel 33 to register with each of the screws 34. The shank of each of the screws 34 fits into a notch 41 (FIG. 1) provided therefor in each of the plates 40.

When the wing nuts 39 are screwed down, with the screws 34 fitted into the notched plates 40, as illustrated in solid lines in FIG. 3, the gasketed lower edge of the windshield A is drawn thereby into tight, sealing engagement with the deck 12. Upon releasing the wing nuts 39, and swinging the clamp screws 34 downwardly to their broken line position of FIG. 3, the windshield A may be swung rearwardly over the heads of occupants (not shown) of the seat 17, who, during this process, may duck down if necessary to insure that the windshield clears their heads. After the windshield has been swung rearwardly to its broken line position of FIG. 1, the way is clear for an occupant of the cockpit 10 to step onto the forward deck 12 without hindrance from the windshield. This is a great convenience and safety feature in anchoring or docking the boat, at which times it is almost essential to have a person on the forward deck.

In order to provide for additional ventilation at slow speeds, the nuts 11a may be screwed upwardly on their clamp screws 34 as shown in FIG. 4 so as to support the windshield with its lower edge spaced slightly from the fore deck 12.

While I have illustrated and described a preferred embodiment of the present invention, it will be understood, however, that various changes and modifications may be made in the details thereof without departing from the scope of the invention as set forth in the appended claims.

Having thus described the invention, what I claim as new and desire to protect by Letters Patent is defined in the following claims.

I claim:

1. A swing-over windshield for a motorboat having a cockpit with a fore deck forwardly of the cockpit and with a seat at the forward end of the cockpit, said windshield comprising a pair of hinge anchors mounted one on each side of, and spaced rearwardly from the forward end of, such cockpit by a distance equal to approximately one-half the distance from the extreme forward end of the cockpit to a point just aft of said seat, a windshield transparent plate member comprising a forward portion of the windshield and adapted to extend transversely, in spray shielding position, across the forward end of such cockpit, a pair of rearwardly extending windshield side portions secured at their forward ends in supporting relation to said transverse forward portion, and of a length to extend rearwardly from the transverse forward portion along opposite sides of such cockpit to the hinge anchors, said side portions tapering toward their rearward ends, cooperating hinge means on the rearward end of each side portion, each of said cooperating hinge means being hingedly interconnected to one of said hinge anchors, the lower edge of said transverse forward portion in its forwardly swung position being shaped to conform to such deck around the forward end of such cockpit, means releasably retaining the transverse forward portion in its forwardly swung position adjacent such deck, and releasable to free the transverse forward portion for rearward swinging movement by said side portions about the hinged interconnection of the hinge means to the hinge anchors and over the head of an occupant of such seat to a position rearwardly of such occupant, thereby clearing the way for access by such occupant to such fore deck.

2. A swing-over windshield for a motorboat having a cockpit with a fore deck forwardly of the cockpit, and with a seat at the forward end of the cockpit; said windshield comprising a transparent plate forward portion adapted to extend in spray shielding position transversely across the forward end of such cockpit, a pair of rearwardly tapered windshield side portions secured at their forward ends in supporting relation one to each end of said transverse forward portion and each of a length to extend from the transverse forward portion along a side of such cockpit a distance equal to one half the distance from the forward end of the cockpit to the after side of said seat, co-axial hinge means on the rear end of each side portion for hingedly connecting the windshield to the sides of such cockpit, the lower edge of said forward portion in the forwardly swung position of the windshield being shaped to conform to such deck around the forward end of such cockpit, means releasably retaining the windshield in forwardly swung position adjacent such deck, and releasable to free the windshield for rearward swinging movement about the common axis of said hinge means and over the head of an occupant of such seat to a position rearwardly thereof, thereby clearing the way for access by such occupant to such fore deck.

3. A swing-over windshield for a motorboat having a cockpit with a fore deck forwardly of the cockpit, and with a seat at the forward end of the cockpit; said windshield comprising a transparent plate forward portion adapted to extend in spray shielding position transversely across the forward end of such cockpit, a pair of rearwardly extending, similar, triangular, windshield side portions each attached along corresponding sides thereof in supporting relation to an end of said transverse forward portion and each of a length to extend from the transverse forward portion rearwardly along a side of such cockpit a distance equal to one half the desired rearward swing of the forward portion of the windshield, a metal trim member secured along the entire lower edges of the transverse forward portion and the side portions, said trim member being shaped to conform to such deck around the forward end of such cockpit, co-axial hinge means on the rear apex of each triangular side portion for hingedly connecting the windshield to the sides of the cockpit, means for releasably retaining the windshield in forwardly swung position adjacent such deck, and releasable to free the windshield for rearward swinging movement about the common axis of said hinge means and over the head of an occupant of such seat to a position rearwardly thereof, thereby clearing the way for access by such occupant to such fore deck.

4. An arrangement according to claim 3 wherein a resilient sealing gasket is secured along the underside of the trim member for sealing compression between the trim member and such deck when the trim member is secured thereto by said retaining means.

5. An arrangement according to claim 3 wherein means is provided for supporting the lower edge of the windshield in spaced relation to the fore deck to provide ventilation therebetween at slow speeds.

References Cited in the file of this patent

UNITED STATES PATENTS

| | | |
|---|---|---|
| 1,559,352 | Nelson | Oct. 27, 1925 |
| 1,788,436 | Lunt | Jan. 13, 1931 |
| 1,806,366 | Pivak | May 19, 1931 |
| 2,125,023 | Hedin | July 26, 1938 |
| 2,731,220 | Power | Jan. 17, 1956 |

FOREIGN PATENTS

| | | |
|---|---|---|
| 623,891 | Great Britain | May 24, 1949 |